INVENTORS
Thomas A. Daly and
Herbert L. Prescott
BY
Paul E. Friedemann
ATTORNEY

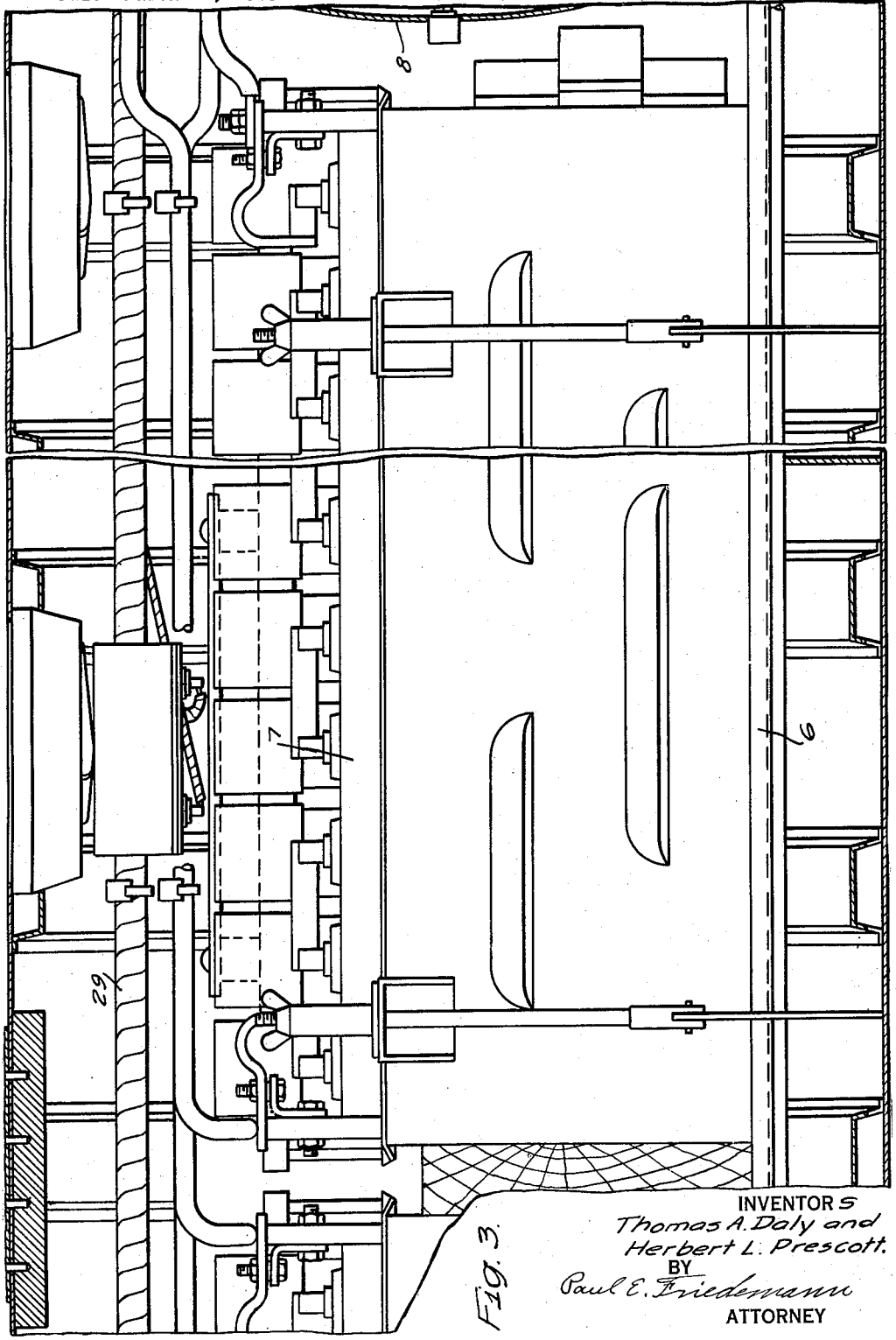

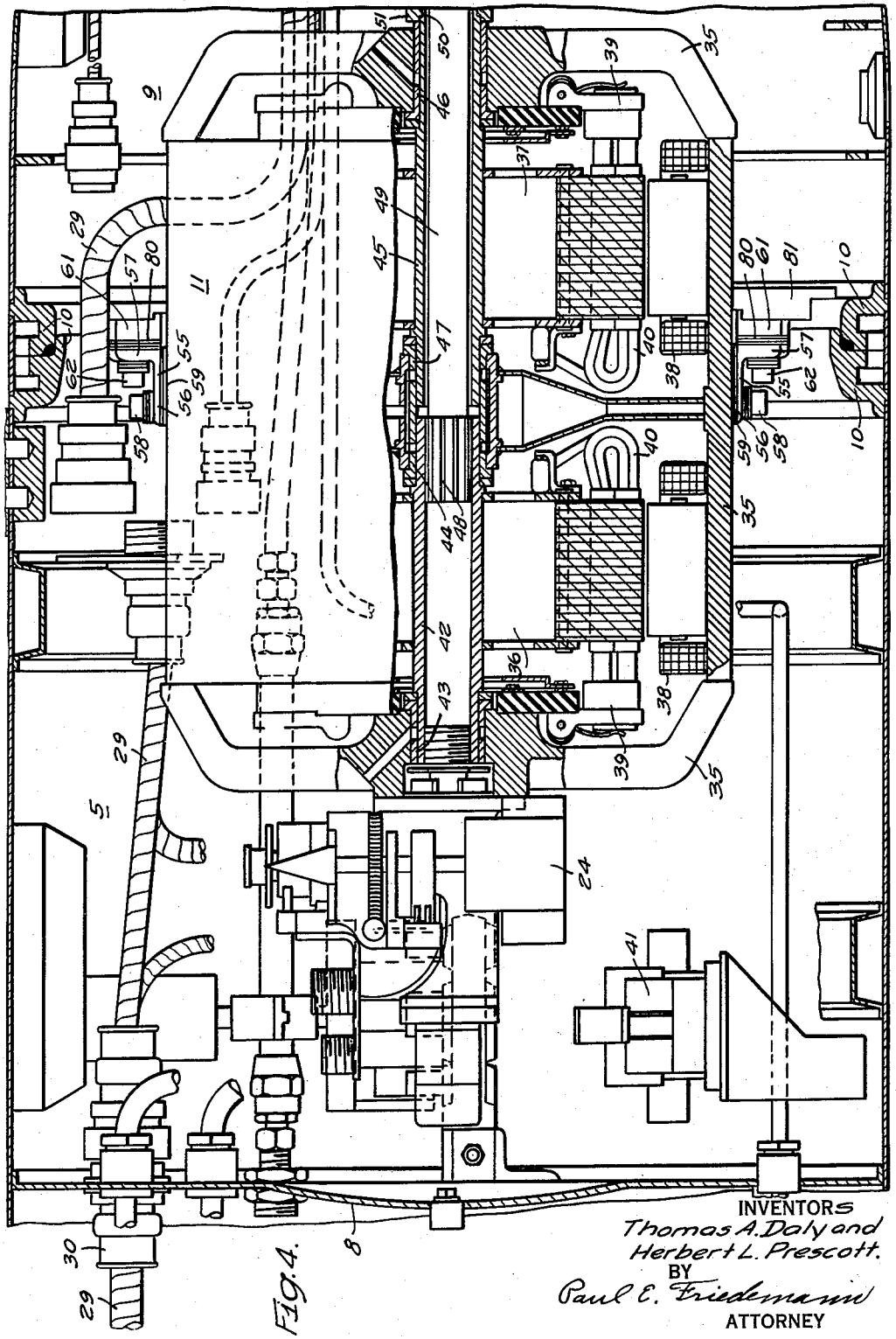

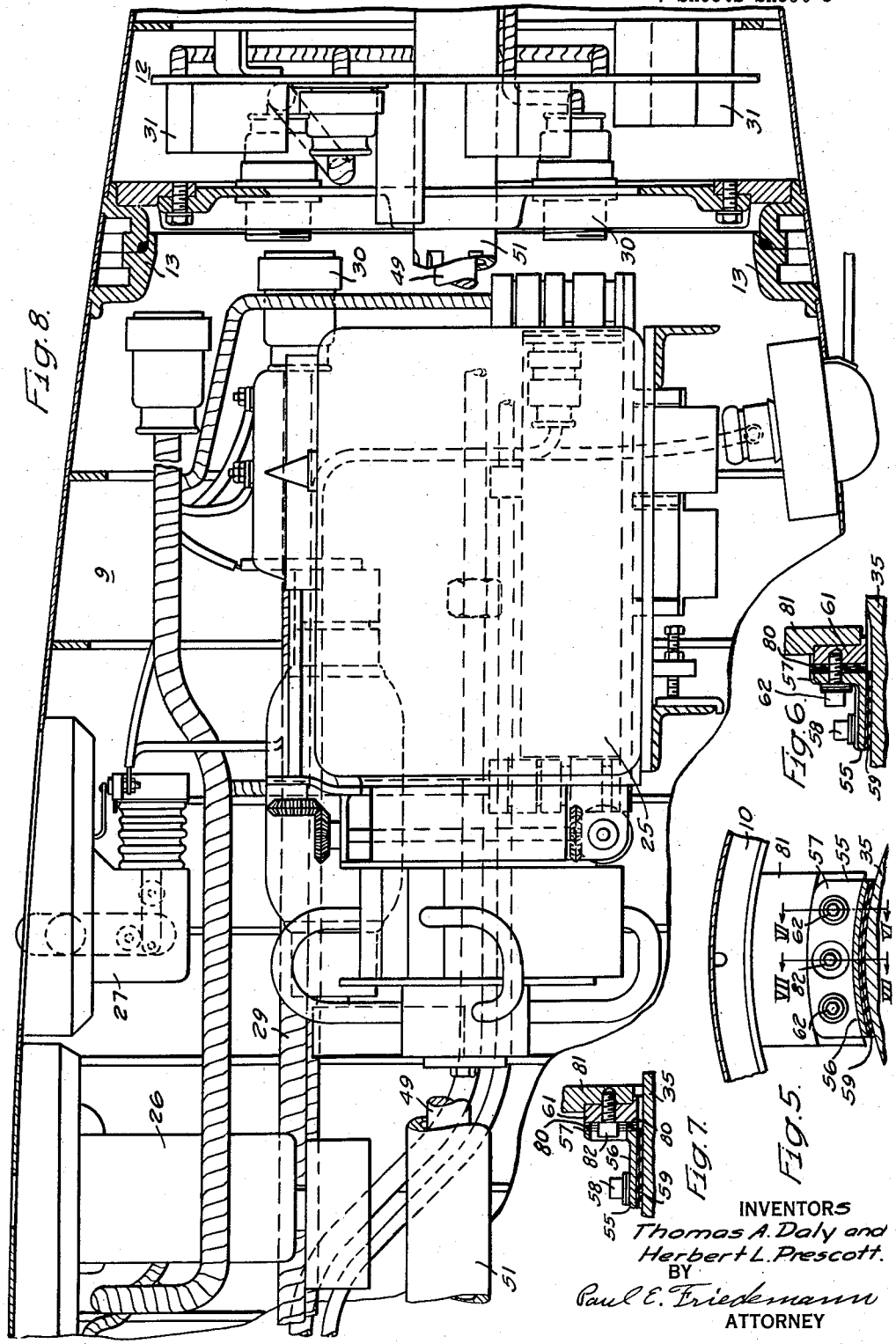

Aug. 18, 1959  T. A. DALY ET AL  2,899,923
SOUND DAMPING APPARATUS FOR TORPEDO PROPULSION MECHANISMS
Filed March 13, 1948  7 Sheets-Sheet 6
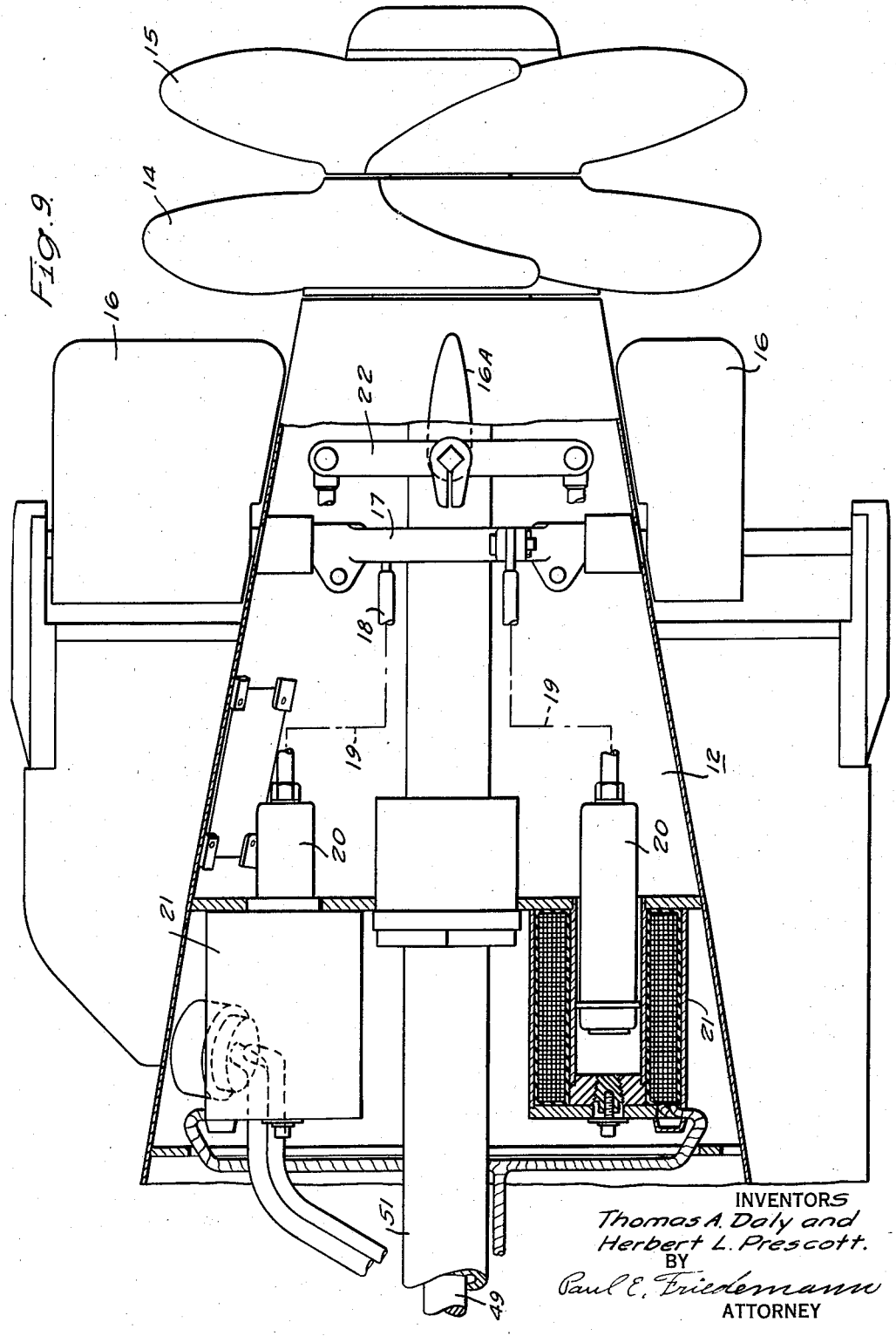
INVENTORS
Thomas A. Daly and
Herbert L. Prescott.
BY
Paul E. Friedemann
ATTORNEY

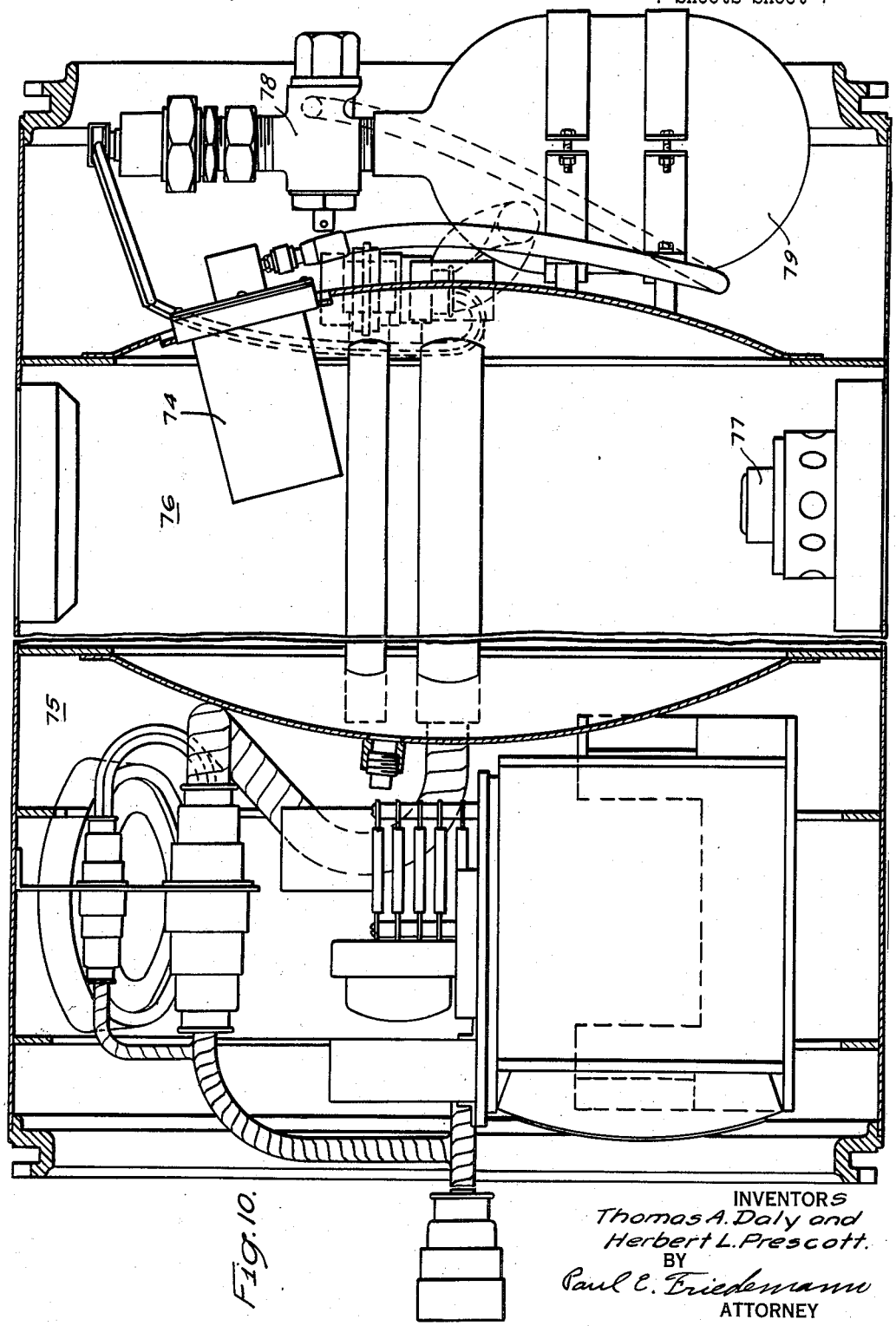

United States Patent Office 2,899,923
Patented Aug. 18, 1959

2,899,923

SOUND DAMPING APPARATUS FOR TORPEDO PROPULSION MECHANISMS

Thomas A. Daly and Herbert L. Prescott, Sharon, Pa., assignors, by mesne assignments, to the United States of America as represented by the Secretary of the Navy Application March 13, 1948, Serial No. 14,736

2 Claims. (Cl. 114—20)

This invention relates to torpedoes of the acoustic type in which sound responsive control devices are provided for automatically directing their course of travel to a target. More specifically, this invention relates to an improved arrangement of the structural features of a torpedo by which the noise produced by operation of the torpedo propulsion mechanism is reduced to a minimum, and by which such noise as is produced by the propulsion mechanism, is effectively prevented from being transmitted to the nose of the torpedo in which the sound responsive control devices are mounted.

Conventionally constructed torpedoes having electric propulsion drives present objectionable features when used with sound responsive control mechanism for automatically directing their course of travel to a target. In such torpedoes, the operation of the electric drive mechanism produces noise vibrations of considerable magnitude, and this is particularly true where counter-rotating propellers are provided, in which case the common practice has been to provide gearing between the propellers and the electric drive motor for effecting counter rotation of the propellers. The gearing for effecting counter-rotation of the propellers creates additional noise which adds to the noise of the electric drive. The mounting of the propulsion motor and drive is such that the noises are transferred directly to the metallic hull or shell of the torpedo, which in turn functions first, to carry the noise directly to the sound responsive control devices, and, second, to transmit the noise into the water and thence to the sound responsive elements. The subjection of the sound responsive elements to such noise vibrations reduces their sensitivity to the sound emanating from a target to be tracked down. The noise generated by the torpedo drive mechanism is thus effective to materially interfere with the sound responsive control mechanism when such mechanism is installed in a torpedo hull of conventional construction having a conventional type of electric drive mounted therein.

One of the principal objects of this invention is to provide improved structural features in a torpedo by which the noise produced by its propulsion mechanism is prevented from interfering with its sound responsive control apparatus.

A further object of the invention is to provide an improved construction of torpedo hull by which noise vibrations generated by an electric drive motor are insulated from the hull, and in which such noise vibrations as are transmitted to the hull are prevented from travelling through the hull, to the sound responsive control apparatus.

A further object of this invention is to provide an improved mounting for an electric propulsion motor in a torpedo which is operative to reduce the transmission of noise vibrations produced by its operation to the hull of the torpedo in which the motor is mounted.

A still further object of this invention is to provide an improved electric motor construction which is operative to impart counter rotation to a pair of propeller shafts without the necessity of employing reverse gearing and is thereby effective to reduce the amount of noise produced by operation of the propulsion mechanism.

Other objects and advantages of this invention will become apparent from the following description.

In the drawings there is shown a preferred embodiment of the invention. In this showing:

Fig. 3 is a longitudinal sectional view of the battery compartment, a portion being broken away centrally thereof;

Fig. 4 is a longitudinal sectional view of the aft of the battery compartment and the fore of the afterbody;

Fig. 5 is a fragmentary view, partially in section, showing in detail one of the mounting structures by which the motor shown in Fig. 4 is mounted in the afterbody;

Fig. 6 is a sectional view taken substantially along the line VI—VI of Fig. 5;

Fig. 7 is a sectional view taken substantially along the line VII—VII of Fig. 5;

Fig. 8 is a longitudinal sectional view of the aft of the afterbody and the fore of the tail cone;

Fig. 9 is a longitudinal sectional view of the aft of the tail cone, and

Fig. 10 is a longitudinal view, a portion being broken away centrally thereof, of a practice head which is employed in place of the warhead shown in Figs. 1 and 2 when the torpedo is being used on practice runs.

Figure 1:
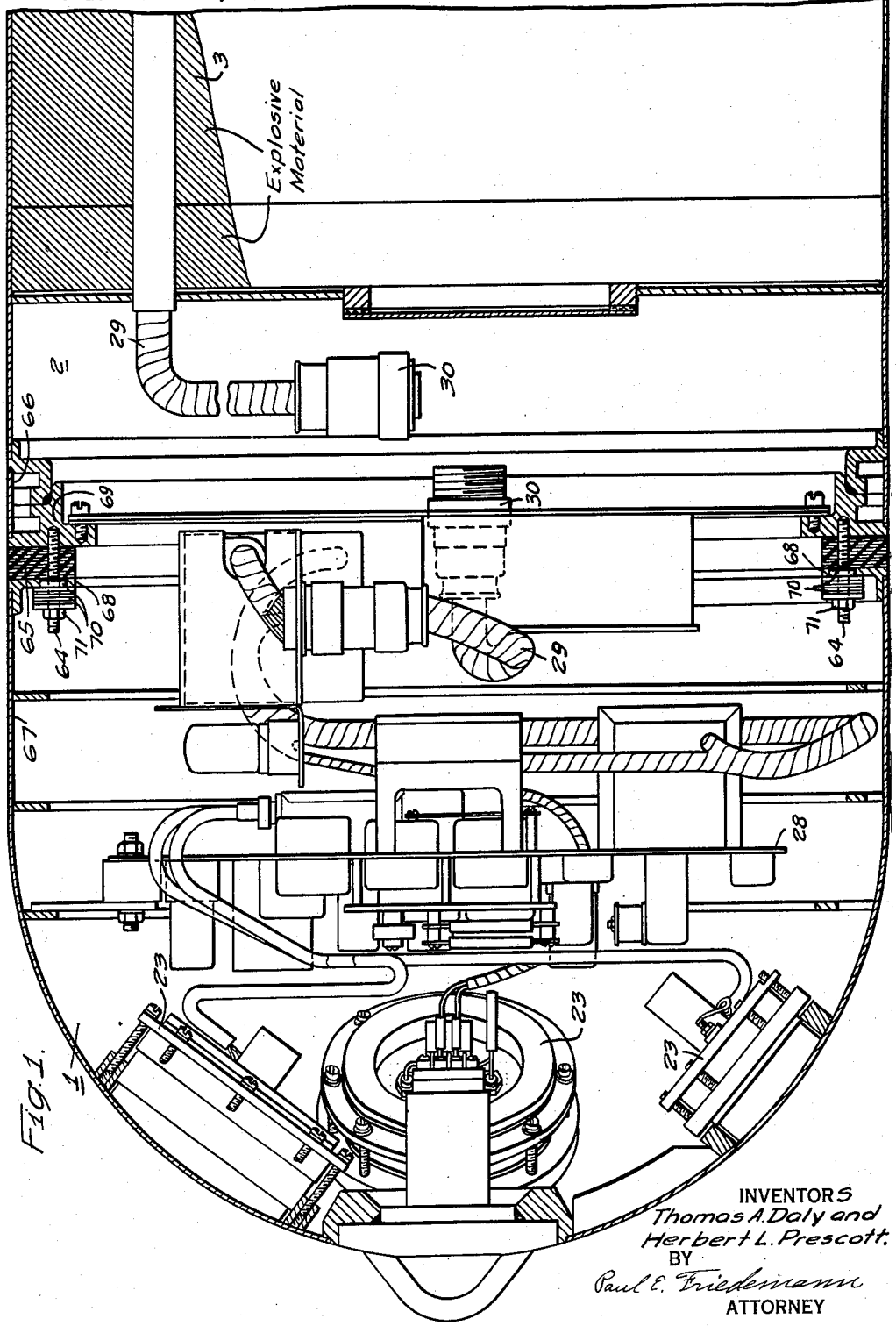
Figure 1 is a longitudinal sectional view of the nose of a torpedo showing its connection to the torpedo warhead.
Figure 2:
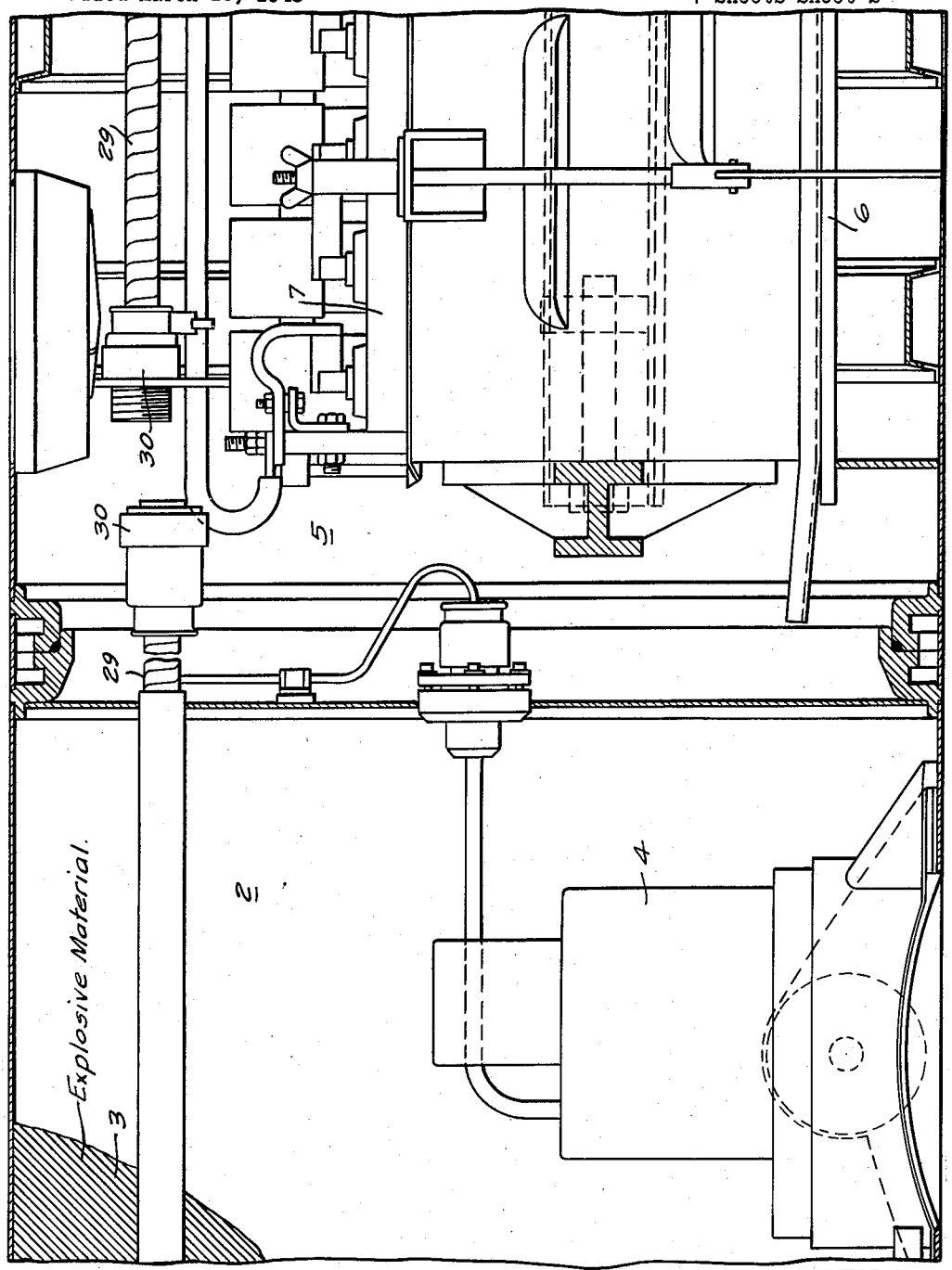
Fig. 2 is a longitudinal sectional view of the aft of the warhead and the fore of the torpedo battery compartment.

In the drawings, Figs. 1 through 4 and Figs. 8 and 9 illustrate the various sections or compartments from which the torpedo is constructed. Referring to these figures in numerical sequence, the numeral 1 designates the nose of a torpedo which is secured to a warhead 2 in which is mounted an explosive charge 3 and which contains arming and exploder mechanism 4 for firing the charge 3. The warhead 2 is secured to a battery compartment 5 which is provided with trays 6 on which are mounted batteries 7 which provide a source of power for operating the torpedo. The aft end of the battery compartment is sealed by a bulkhead 8 and is secured to an afterbody 9 by joint rings 10. A motor 11 is mounted at the point of connection of the compartments 5 and 9 in a manner to be described. The afterbody 9 is connected to a tail cone 12 by means of joint rings 13 suitably secured together. The tail cone is provided with a pair of counter-rotating propellers 14 and 15 and with horizontal and vertical steering mechanism including steering rudders 16 and elevators 16A. The rudders 16 are operated by a shaft 17 rotatably mounted in the tail cone assembly 12. Steering movement is imparted to the shaft 17 by operating members 18 mechanically connected, as indicated by the dotted lines 19, to the plungers 20 of electric solenoids 21. The operation of the elevational rudders 16A is controlled by a link 22 which is operated by a pair of solenoids (not shown) similar to the solenoids 21.

The details of the electrical system for controlling the operation of the steering rudders are fully described and set forth in the copending application of T. A. Daly and Stephen Kowalyshyn, Jr., Serial No. 748,078, filed May 14, 1947. Since the electrical system for operating the steering rudders forms no part, per se, of this invention, it will be sufficient to point out that the operation of the steering mechanism is primarily under the control of a plurality of hydrophones 23 mounted in the nose compartment 1, a variable enabler 24 mounted in the aft of the battery compartment 5, and control devices in the afterbody 9 such as a gyro steering unit 25, a depth control unit 26, and a starter switch 27. The hydrophones 23, which may be of a magnetostriction or piezo crystal type, are electrically connected to a panel 28 which is connected with other control components aft by means of an electrical cable 29. The cable 29 is formed in sections and is provided with detachable couplings 30 by which the cable sections in the various torpedo compartments may be electrically connected together. Electrical intelligence from the hydrophones 23 and the control devices such as the variable enabler 24, the gyroscope steering unit 25, depth control unit 26 and starter switch 27 are transmitted to relays 31 in tail cone 12 which control the energization of the operating solenoids for the steering control rudders. As pointed out above, the steering apparatus and electrical control system therefor forms no part of this invention and is completely covered and described in the above-mentioned copending application to which reference is hereby made.

This invention is primarily concerned with mechanical features by which sound vibrations due to operation of the torpedo propulsion mechanism are prevented from interfering with the operation of the hydrophones 23 and from reducing the sensitivity of the hydrophones 23 to sound emanating from the target at which the torpedo has been fired. In conventional torpedo constructions, the noise vibrations due to operation of the torpedo propulsion mechanism are transmitted directly to the metallic hull of the torpedo and through the metallic hull to the hydrophones 23. Such vibrations thereby interfere with the operation of the hydrophones 23 and reduce their sensitivity to sound issuing from a target.

Referring to Fig. 4, it will be noted that the motor 11 is a special type of direct current motor designed to eliminate reversing gears and the noise vibrations resulting therefrom. The motor 11 comprises a magnetic frame 35 in which a pair of rotors 36 and 37 are mounted for rotation independently of each other. Each of the rotors 36 and 37 is provided with separate field windings 38 mounted on the frame 35 and brushes 39 for energizing the windings 40 carried by the rotors 36 and 37. The electrical connections for supplying the field windings 38 and the rotor windings 40 with energizing current from the battery 7 are so arranged that upon energization of the motor 11, by operation of its contactor 41 mounted on the aft of the battery compartment 5, the rotors 36 and 37 will rotate in opposite directions. The rotor 36 is carried by a hollow shaft 42 which is rotatably supported on the frame 35 by bearings at 43 and 44. The rotor 37 is similarly mounted on a hollow shaft 45 which is rotatably supported on the frame 35 by bearings at 46 and 47. Upon energization of the motor 11, the shafts 42 and 45 will be rotated in opposite directions. The hollow shaft 42 is provided with an internal spline connection 48 to the end of a drive shaft 49. The hollow shaft 45 extends outwardly of the motor frame 35, to the right as viewed in Fig. 4, and is provided with an external spline connection at 50 to a hollow shaft 51. Only a portion of the spline connection 50 of the shaft 45 to the hollow shaft 51 is shown at the extreme right of Fig. 4. It will thus be seen that the inner shaft 49 and the outer shaft 51 will rotate in opposite directions upon energization of the motor 11. The shafts 49 and 51 extend through the afterbody 9 and tail cone compartment 12 as indicated by the broken away portions thereof illustrated in Figs. 8 and 9. The shafts 49 and 51 are provided with direct mechanical connections (not shown) to the propellers 14 and 15. It will thus be seen that energization of the motor 11 is effective to rotate the propellers 14 and 15 in opposite directions. Attention is particularly invited to the fact that the counter rotation of the propellers 14 and 15 is effected by the motor 11 without the need of providing differential or reversing gearing as is usually done in conventional drives. The noise incidental to the use of such gearing is thus eliminated.

In order to materially reduce transmission of noise incident to the operation of motor 11 to the shell of the torpedo, a special mounting is provided for the motor 11. Referring to Fig. 4, it will be noted that there is provided a plurality of L-shaped brackets 55, preferably at least 6 in number, distributed about the exterior surface of the motor 11. The structure of the L-shaped brackets 55 and the manner in which they support the motor 11 will be best understood by referring to Figs. 5, 6, and 7. From this showing it will be noted that each of the brackets 55 is provided with a horizontally extending flange 56 and a vertically extending flange 57. The horizontally extending flange 56 is secured to the motor frame 35 by suitable fastening devices such as the bolts 58. Sound insulating material 59 in the nature of a plurality of layers of rubberized fabric or vulcanized fibre are inserted between the flanges 56 and motor frame 35 for damping sound vibrations traveling in a direction radially outwardly from the motor 11.

The vertically extending flange 57 is secured to a mounting plate 61 by a suitable fastening device such as a bolt 62. Sound insulating material 80 in the nature of a plurality of layers of rubberized fabric or vulcanized fibre are inserted between the flange 57 and plate 61 for damping sound vibrations traveling in a direction longitudinally of the motor 11. As best shown in Fig. 7, each mounting plate 62 is secured to a supporting lug 81 by bolts 82. Openings are provided in the flange 57 and insulating material 80 so that the heads of the bolts 82 will be readily accessible. Each supporting lug 81 is rigidly secured to one of the joint rings 10 as by welding. In this manner, all parts of the flange 57 are separated from the metallic hull by sound insulating material. From the foregoing, it will be apparent that the bracket members 55 are operative to support the motor 11 on the joint rings 10, and that the insulating material at 59 and 80 is effective to reduce the transmission of noise vibrations to the metallic shell of the torpedo. Actual measurements have shown that a very great reduction is achieved.

Referring to Fig. 1, it will be noted that the nose 1 of the torpedo has a semi-spherical shape as distinguished from the tapered nose construction common in conventionally constructed torpedoes. By constructing the nose 1 with a semi-spherical shape, it is possible to mount the hydrophones 23 with their axes extending at a more acute angle with respect to the axis of the torpedo than is possible with the conventional tapered nose torpedo construction. In this manner, the hydrophones 23 look in a more forward direction with respect to the torpedo and are more sensitive to sounds coming from a direction toward the nose of the torpedo. More important, the mounting of the hydrophones 23 provided by the semi-spherical shaped nose 1 renders the hydrophones less sensitive to noise coming from the machinery and propellers of the torpedo itself.

A special mounting is provided for connecting the nose 1 to the warhead 2 in order to prevent the transmission of noise vibrations through the metallic shell of the torpedo to the nose 1. This mounting comprises an annulus 65 of sound insulating material formed of a plurality of layers of rubberized fabric which is positioned between the metal 66 of the warhead 2 and the metal 67 of the nose 1. A plurality of threaded fastening elements 64 operate to clamp the sound insulating annulus 65 between annular flanges 68 and 69 secured respectively to the nose 1 and warhead 2. Sound insulating material 70 is positioned between a clamping nut 71 and the annular flange 68 and also, in the form of a washer, around the stud 64 where it passes through flange 68, in order that noise will not be transmitted from the compartment 2 to the nose 1 through the fastening elements 64.

From the foregoing, it will be noted that the particular construction of motor 11 operates to reduce the amount of noise produced in imparting counter rotation to the shafts 49 and 51 as compared to conventional drives employing reversing or differential gearing to effect counter rotation. Attention is also invited to the fact that the mounting of the motor 11 by the brackets 55 eliminates metal-to-metal contact between the motor 11 and the shell of the torpedo and thus is effective to reduce the transmission of noise to the shell of the torpedo. By reason of this structure, the amount of noise which is transmitted through the shell of the torpedo to the hydrophones 23 mounted in the nose 1 is considerably reduced as compared to conventional torpedo constructions. It will also be noted that the sound insulation provided by the annulus 65 forming part of the connection of the nose 1 to the warhead 2 is effective to dampen such noise vibrations as are produced in the shell of the torpedo during its operation and to thereby prevent transmission of such noise vibrations to the hydrophones 23. It will thus be seen that the structure of the motor 11 involving the provision of two counter-rotating rotor elements 36 and 37 together with the sound insulating support provided by the brackets 55 cooperate with the sound insulating annulus 65 in protecting the hydrophones 23 from noise vibrations produced by operation of the torpedo.

In Fig. 10 there is shown an exercise head 75 which is used in place of the warhead 2 when the torpedo is to be used for practice runs. The exercise head, when it is to be used, is secured between the nose 1 and battery compartment 5 in the same manner as the warhead 2. The exercise head is provided with a central chamber 76 in which a quantity of ballast solution, corresponding in weight to the explosive charge in the warhead, is placed. By suitable controls which form no part of this invention, the solution is discharged from the chamber 76 at the end of a practice run through an exhaust valve 77. At the end of a practice run, valve mechanism 78 is operated to connect a tank 79 containing compressed carbon dioxide or other suitable gas under pressure with the interior of the chamber 76 through a discharge orifice 74. The increased pressure in the chamber 76 will be effective to force the water therein out through the exhaust valve 77. The exhaust of water from the chamber 76 will render the torpedo buoyant and it will then surface so that it may be recovered and used again.

Since certain changes may be made in the above-described construction and different embodiments of the invention may be made without departing from the spirit and scope thereof, it is intended that all the matter contained in the above description and shown in the accompanying drawings shall be considered as illustrative and not in a limiting sense.

We claim as our invention:

1. In a torpedo of the acoustic type having a metallic shell formed of a plurality of compartment, the combination comprising an electric propulsion motor, a pair of counter-rotating propulsion shafts, said motor having a pair of rotors rotating in opposite directions independently of each other, each of said rotors being directly connected with a different one of said shafts so that rotary motion of said rotors will be effective to impart counter rotation to said shafts directly without the necessity of conventional reversing gearing between said shafts and motor, an L-shaped bracket for mounting said motor in one of said compartments, said one compartment having a support extending radially inwardly to which said bracket may be secured, a layer of sound insulating material between said bracket and motor for damping the transmission of noise vibrations in a radial outward direction from said motor, a layer of sound insulating material between said bracket and support for damping the transmission of noise vibrations in a direction longitudinally of said motor, said layers of sound insulating material being operable to damp the transmission of noise vibrations produced by operation of said motor to said shell, the fore compartment of said shell being the nose of said torpedo, said fore compartment having sound responsive control devices mounted therein for directing the travel of said torpedo to a target, and means connecting said fore compartment to the next aft compartment including a layer of sound insulating material for damping the transmission of noise vibrations from said shell to said fore compartment and thereby to the sound control devices mounted in said fore compartment.

2. In a torepdo of the acoustic type having a metallic shell formed a plurality of compartments, the combination comprising an electric propulsion motor, a pair of counter-rotating propulsion shafts, said motor having a pair of rotors rotating in opposite directions independently of each other, each of said rotors being directly connected with a different one of said shafts so that rotary motion of said rotors will be effective to impart counter rotation to said shafts directly without the necessity of conventional reversing gearing between said shafts and motor, an L-shaped bracket for mounting said motor in one of said compartments, said one compartment having a support extending radially inwardly to which said bracket may be secured, a layer of sound insulating material between said bracket and motor for damping the transmission of noise vibrations in a radial outward direction from said motor, a layer of sound insulating material between said bracket and support for damping the transmission of noise vibrations in a direction longitudinally of said motor, said layers of second insulating material being operable to prevent the transmission of noise vibrations produced by operation of said motor to said shell, the fore compartment of said shell being the nose of said torpedo and having a substantially semi-spherical shape, a plurality of sound responsive hydrophones mounted on the inner surface of said fore compartment, the spherical shape of said fore compartment enabling the mounting of said hydrophones with their axes projecting in a direction substantially forward of the torpedo so as to reduce the sensitivity of said hydrophones to noise vibrations emanating from the aft compartments of said shell, and means connecting said fore compartment to the next aft compartment including a layer of sound insulating material for damping the transmission of noise vibrations from said shell to said fore compartment and thereby to the sound control devices mounted in said fore compartment.

References Cited in the file of this patent

UNITED STATES PATENTS

| | | |
|---|---|---|
| 1,101,830 | Berger | June 30, 1914 |
| 1,588,932 | Blair | June 15, 1926 |
| 1,960,240 | Clement | May 29, 1934 |
| 2,103,154 | Faber | Dec. 21, 1937 |
| 2,346,680 | Harper | Apr. 18, 1944 |
| 2,390,479 | Watson et al. | Dec. 4, 1945 |
| 2,409,632 | King | Oct. 22, 1946 |
| 2,414,928 | Chilton | Jan. 28, 1947 |
| 2,457,393 | Muffly | Dec. 28, 1948 |